(12) United States Patent
Hasak et al.

(10) Patent No.: US 6,463,955 B2
(45) Date of Patent: Oct. 15, 2002

(54) HAND OPERATED ROTARY HANDLE WITH LOCKOUT

(75) Inventors: David J. Hasak, Concord; Michael A. Fornes, Lakewood; Jennifer K. Peteritis, Painesville, all of OH (US)

(73) Assignee: Swagelok Company, Willoughby, OH (US)

( * ) Notice: Subject to any disclaimer, the term of this patent is extended or adjusted under 35 U.S.C. 154(b) by 0 days.

(21) Appl. No.: 09/826,580

(22) Filed: Apr. 5, 2001

(65) Prior Publication Data

US 2001/0052362 A1 Dec. 20, 2001

Related U.S. Application Data

(63) Continuation of application No. PCT/US99/23650, filed on Oct. 13, 1999
(60) Provisional application No. 60/104,017, filed on Oct. 13, 1998.

(51) Int. Cl.⁷ .......................... F16K 35/10; F16K 35/02; F16K 37/00
(52) U.S. Cl. .......................... 137/553; 137/556; 251/96; 251/331
(58) Field of Search ................. 137/553, 556; 251/95, 96, 331

(56) References Cited

U.S. PATENT DOCUMENTS

| | | |
|---|---|---|
| 2,797,592 A | 7/1957 | Marrapese |
| 3,773,080 A | 11/1973 | Raschke |
| 4,577,831 A | 3/1986 | DiBartolo |
| 4,691,895 A | 9/1987 | Garff |
| 5,152,187 A | 10/1992 | LaFemina |
| 5,513,831 A | 5/1996 | Seward |
| 5,551,124 A | 9/1996 | Zeringue |
| 5,671,904 A | 9/1997 | Minutillo |

FOREIGN PATENT DOCUMENTS

GB 2 312 489 10/1997

*Primary Examiner*—John Rivell
(74) *Attorney, Agent, or Firm*—Calfee, Halter & Griswold, LLP

(57) ABSTRACT

Rotary handle device includes a coupling mechanism between the handle and a driven member. The handle is rotated about an axis and can also be axially moved between first and second positions. When the handle is in the first axial position it is operatively engaged with the driven member, and when the handle is in its second axial position it is operatively disengaged from the driven member. The handle drives the driven member via a coupling mechanism in the form of a keyed coupling between the handle and the driven member. The handle can be locked or receive a lock out device against rotation when it is in its second axial position. The keyed coupling and/or the pin and track arrangement can be used to permit axial movement of the handle only when the handle is in a predetermined orientation. The handle mechanism is shown in combination with a rotary operated valve having a valve stem as the driven member.

57 Claims, 4 Drawing Sheets

HAND OPERATED ROTARY HANDLE WITH LOCKOUT

RELATED APPLICATIONS

This application is a continuation of Patent Cooperation Treaty Application Ser. No. PCT/US99/23650 which was filed Oct. 13, 1999 and which designated the U.S., itself claiming priority to provisional application Ser. No. 60/104,017, filed Oct. 13, 1998.

TECHNICAL FIELD OF THE INVENTION

The present invention relates to handles for manual actuation of mechanical devices. More particularly, the invention relates to lockout and disengagement features for a rotary handle.

BACKGROUND OF THE INVENTION

Many types of mechanical devices use handles for manual actuation. A typical example is a valve that is opened and closed by manually rotating a handle. The handle is coupled to a driven element such as a valve stem or other actuator mechanism within the valve. The actuator mechanism transforms the rotary motion of the handle into a desired movement that opens and closes the valve. For example, a diaphragm valve may have a valve stem that is rotated directly by the handle. When the valve stem rotates, it causes a relative movement between the diaphragm and a valve seat to thereby open and close the valve.

In some applications it may be desired or required to be able to disable a rotary handle such as with a lockout device or to actually lock the handle against rotation. It may also be desirable or required to disengage the handle from the driven member with or without a locking or lockout feature.

SUMMARY OF THE INVENTION

To the accomplishment of the foregoing objectives, and in accordance with one embodiment of the invention, a rotary handle is provided that includes several aspects that can be used separately or in a variety of combinations. According to one aspect of the invention, a rotary handle coupling mechanism is provided that permits the handle to be coupled and uncoupled from a driven member by an axial translation or displacement of the handle. In one embodiment, the handle can be locked or placed in a lockout condition when the handle is in either or both of the two axial positions.

In accordance with another aspect of the invention, a rotary handle mechanism is provided that restricts the rotary handle to a predetermined angular orientation in order to move the handle axially. In one embodiment, the mechanism also prevents rotation of the handle when the handle is axially moved to a predetermined position. In accordance with yet another aspect of the invention, a rotary handle mechanism is provided that permits the handle to be aligned with any angular orientation at the time of assembly, for example to coincide with angular orientation of a driven member. In one embodiment, the rotary handle mechanism is used in combination with an actuator mechanism for a valve.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

With reference to FIGS. 1–4, a rotary handle mechanism in accordance with the invention is generally indicated by the numeral 10. In this exemplary embodiment, the handle mechanism 10 includes a manually rotated handle 12 that is used in combination with a manually actuated valve A. However, those skilled in the art will readily appreciate that the various features and concepts of the present invention will find application with many actuator devices and other driven members besides valves that include a manually rotated handle. Thus, the invention more generally contemplates arrangements for coupling and uncoupling a rotary handle to a driven member with various additional aspects including among other things a lockout feature if desired.

In the exemplary embodiment herein then, the driven member 14 is the valve stem VS that is rotated in turn by rotation of the handle 12. Furthermore, although in the embodiments described herein the rotary handle 12 axis of rotation is aligned in a coaxial and concentric relationship with the longitudinal axis of the driven member VS, such structural features for the exemplary embodiment are not required to practice the invention. For example, various aspects of the present invention can be applied to rotary handles that actuate a member that lies on an axis transverse the axis of rotation of the handle 12, for example, through a worm gear arrangement. Thus, the handle 12 may be used to rotate a driven member that in turn drives a second driven member as through a worm gear, for example. Further still, the rotary handle 12 may be coupled to a driven member such that rotary motion of the handle 12 causes linear movement of the driven member, for example, through a cam arrangement. Many other variations for specific applications will be readily apparent to those skilled in the art.

Figure 1:
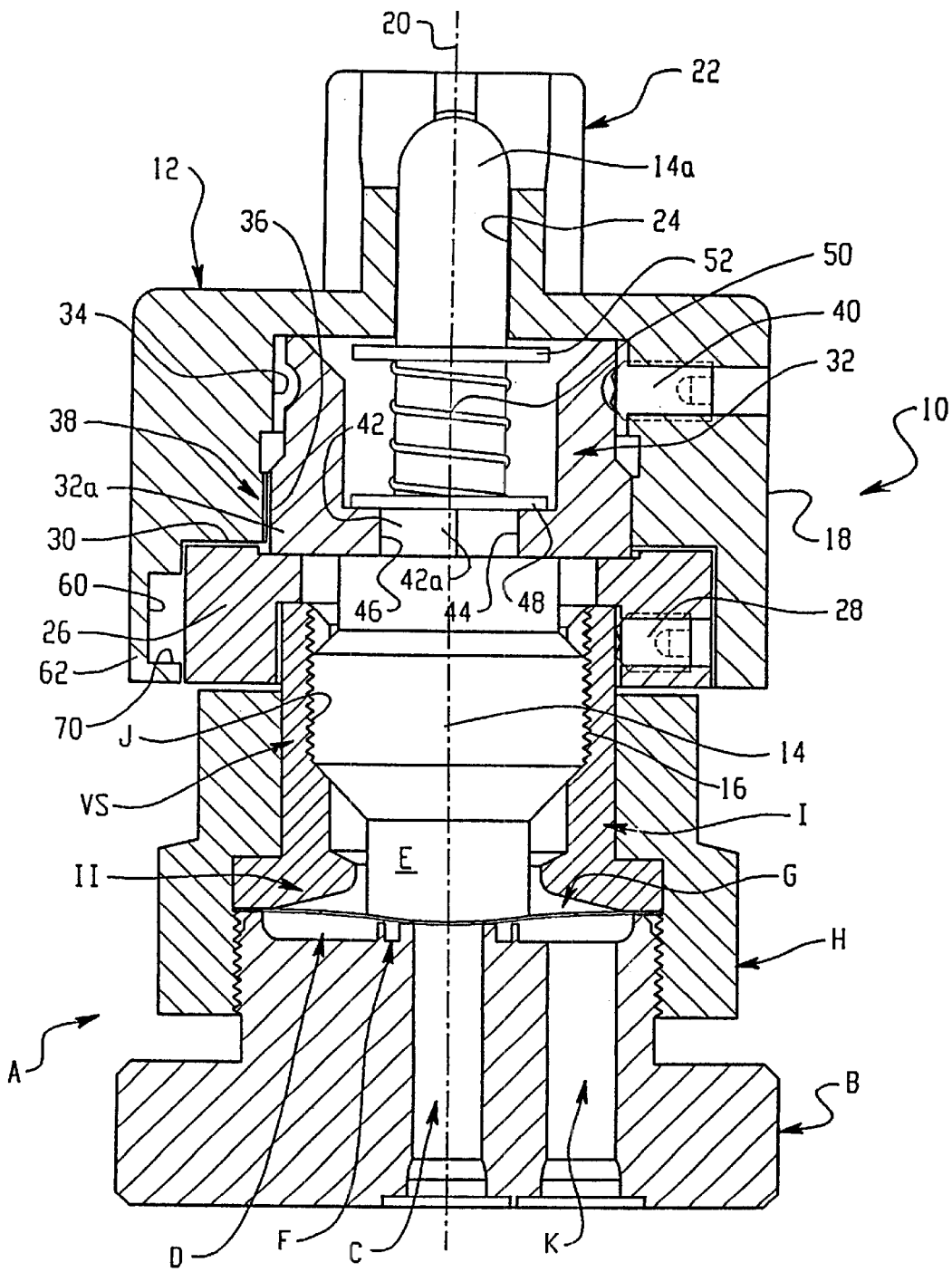
FIG. 1 is a cross-section of a handle mechanism and valve assembly in elevation and illustrating the handle in a first axial position and a first angular orientation.

With particular reference to FIG. 1, the valve A may be conventional in design and in this embodiment is realized in the form of a diaphragm valve. Such a valve may be, for example, part no. 6LVV-MSM-DA-2-P-LDBL available from Nupro Company, Willoughby, Ohio. The specific features of the valve A form no particular part of the present invention and need not be described herein in detail in order to understand and practice the various aspects of the present invention. In this particular example, however, the valve device A that is actuated by the rotation of the handle 12 includes a driven member 14 realized in the form of a valve stem VS. In general, the valve A includes a valve body B with a fluid passage C formed therein. The passage C opens to a valve chamber D. The valve chamber D is sealed against leakage by a diaphragm G as is known. The passage C is closed by displacement of valve stem tip E in contact with the diaphragm G to move the diaphragm G into sealing engagement with a valve seat F. A bonnet nut H is threaded onto the valve body and is used to hold a bonnet I. At one end II the bonnet I clamps the diaphragm G against the valve body B. The bonnet I is internally threaded as at J, and the valve stem 14 is similarly threaded as at 16 so that rotation of the stem in a first direction causes the stem 14 to move to a valve closed position. Rotation of the stem 14 in an opposite direction causes the stem 14 to move to a valve open position thus permitting fluid communication between the passage C and the valve chamber D, as well as other fluid passages in the valve body B such as an outlet passage K.

Therefore, as it pertains to the present invention, the valve A includes a driven member (the valve stem 14) that in response to rotation of the handle 12 can be moved to and between a first position in which the valve is closed and a second position in which the valve is open. The reference herein to the "first" position corresponding to a valve closed condition and the "second" position being a valve open position, is merely for convenience of explanation herein. The exemplary valve herein is a quarter turn valve, meaning that the handle 12 is rotated 90° between open and closed positions of the valve A. However, the present invention is not necessarily limited to devices used with the handle mechanism of the present invention that are actuated with quarter turns. The present invention can be applied to rotary handles that involve any partial turn including half turn, three-quarter turn, any partial turn angular displacement (for example 65°) as well as multi-turn devices.

With continued reference to FIG. 1, the handle assembly 10 includes the handle 12 which in this embodiment is a simple generally cylindrical outer surface 18. The handle in this example is made from a machined aluminum block. The handle 12 can be rotated manually about a longitudinal axis of rotation 20. In this embodiment, the longitudinal axis of rotation 20 of the handle 12 coincides with the axis of rotation of the valve stem 14. As noted herein above, however, the handle axis of rotation 20 could be aligned completely different from the alignment of the driven member 14 depending on the drive arrangement used to translate rotation of the handle 12 into a desired movement of the driven member 14. Accordingly, reference herein to an axis of rotation generally refers to the handle 12 axis of rotation, which in this example is the handle longitudinal axis and also happens to be collinear with the valve stem 14 axis of rotation. The handle 12 further includes an axial extension 22, the purpose of which will be explained in greater detail herein after. The handle extension 22 is somewhat cylindrical and includes a central bore 24 into which a distal end 14a of the valve stem 14 extends.

A cylindrical reference collar 26 is positioned about an end of the bonnet I opposite the diaphragm end II. The reference collar 26 is secured to the bonnet I by any convenient structure such as a set screw 28. The collar 26 may also be keyed to the bonnet I to maintain alignment in the event that the set screw 28 loosens. The collar 26 includes a generally annular planar surface 30 that faces away from the valve A. As best illustrated in FIG. 2, indicia are placed on the collar surface 30, in this example the word "OPEN" and the word "CLOSED". Additional indicia such as a green background for open and a red background for closed can also be used with the lettering or in lieu thereof.

The collar 26 is non-rotational with respect to the rotary handle 12 and the driven member 14, hence it provides a convenient reference structure for the handle mechanism 10.

Thus, the collar 26 includes a protrusion or guide 30 (FIG. 3) affixed thereto. In this embodiment, the guide is realized in the form of a pin. Other positionally fixed structures such as a machined extension from the surface of the collar 26 could also serve the function of the guide pin 30.

The handle mechanism 10 further includes a cylindrical base member 32 that is sized to easily fit concentrically within a central bore 34 in the handle 12 and at one end 32a is positioned axially adjacent the upper surface 30 of the reference collar 26 when the handle 12 is in a first axial position illustrated in FIG. 1. A spline portion 36 is provided on a portion of the outer circumferential surface of the base 32. The handle 12 includes a corresponding spline 38 about a portion of the inner bore 34. The spline coupling 36, 38 between the handle 12 and the base member 32 permits the handle 12 to have any angular orientation with respect to the base member 32 when the handle 12 and the base 32 are engaged at the spline. A set screw 40 or other suitable device is used to secure the handle 12 and the base member 32 together for mutual rotation.

The valve stem 14 includes a keyed portion 42. In this embodiment, the key 42 is realized in the form of a series of flats 42a that are radially non-symmetric. The handle base 32 is formed with an inner key way 44 that slides over the and operatively engages the valve stem key 42 only when the base 32 is in a predetermined angular orientation with respect to the key 42. The key way 44 is formed on a lower flange 46 of the base member 32 that extends radially with respect to the valve stem 14. When the stem key 42 and the key way 44 are engaged, the handle 12 can be used to turn the valve stem 14 via the interconnecting base 32. However, when the base 32 is disengaged from the stem key 42, rotation of the handle 12 will not turn the valve stem 14. In FIG. 1, the base 32 is shown in an engaged position with the stem key 42.

It is noted that the keyed coupling between the base 32 and the valve stem 14 is one of two examples of a coupling mechanism between the handle 12 and the valve stem 14 used in the exemplary embodiment. The other will be described shortly hereinafter. Either could be used alone as well as together. In the exemplary embodiment, as will be further explained herein, the keyed coupling 42, 44 is used primarily as a backup in case the primary coupling mechanism is defeated. An advantage of these coupling mechanisms is that the handle 12 always re-engages the valve stem 14 in the same angular orientation as when the handle 12 was disengaged.

A washer 48 rests on an upper surface of the flange 46. A cylindrical spring 50 is slipped over the valve stem extension 14a and rests against the washer 48. A snap ring 52 is used to hold the spring 50 in place. The spring 50 biases the handle 12 and the base 32 downward as viewed in FIG. 1 towards an engaged position. The snap ring 52 prevents the handle from being entirely separated from the valve A.

Figure 2A:
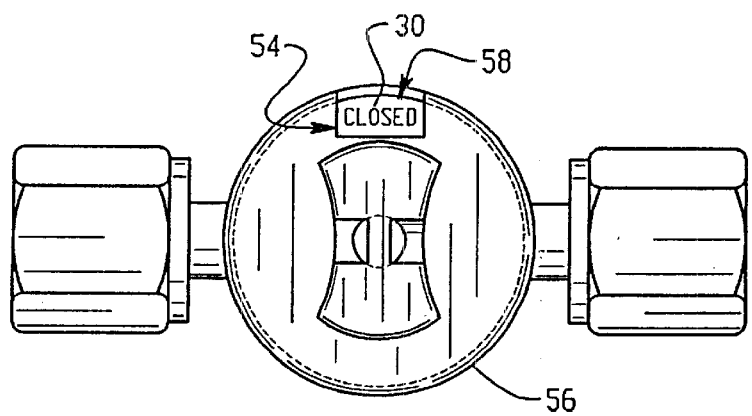
FIGS. 2A and 2B are top views of the apparatus of FIG. 1 showing the handle rotated in first and second positions to actuate a valve.
Figure 2B:
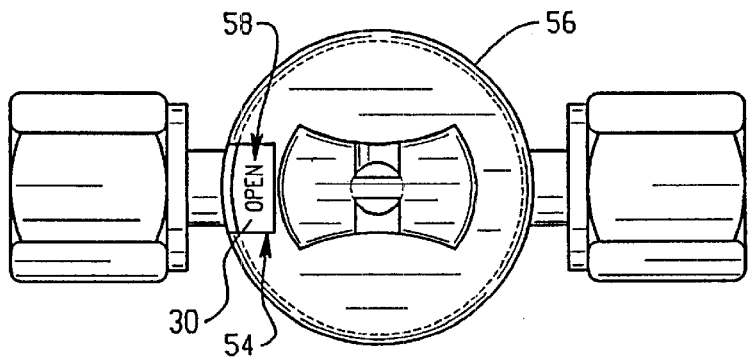
Figure 2C:
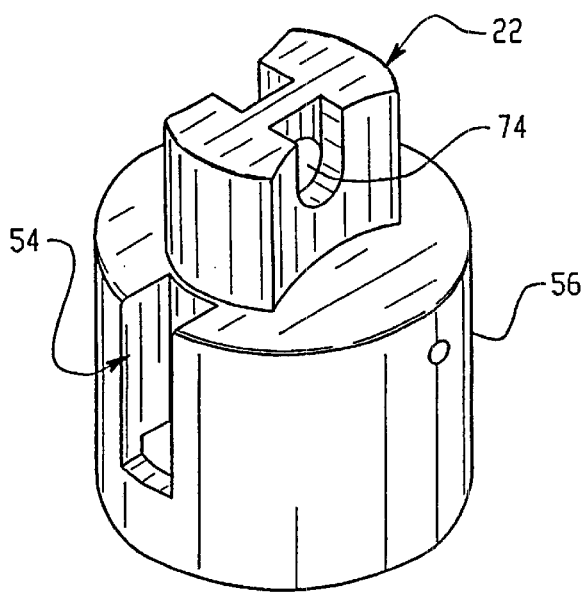
FIG. 2C is a perspective of the handle body for the handle used in FIG. 1.

With reference to FIGS. 2A, 2B and 2C, the handle 12 includes a window 54 in the form of a vertically extending slot. This slot is machined radially inward from the handle outer wall 56 and extends through the bottom of the handle 12. The window 54 is radially positioned so that indicia 58 placed on the upper surface 30 of the collar 26 can be viewed when the window 54 aligns with the indicia 58. For example, the word "OPEN" can be placed on the surface 30, and the word "CLOSED" placed 90° therefrom for the exemplary embodiment that utilizes a quarter turn valve. Only one of the indicia 58 can be viewed at a time, and the indicia are aligned to correspond to the condition of the valve A. In order to achieve this alignment, prior to assembly of the handle assembly 10 onto the valve A, the valve is closed by turning the valve stem 14 to a closed position. The collar 26 is then positioned on the valve A so that the OPEN and CLOSED indicia are in a desired orientation, for example as shown in FIG. 2. Note that the collar 26 can be arranged in any selectable alignment because the handle 12 can be mated to the collar 26 regardless of the collar 26 angular alignment.

After the collar 26 is positioned and secured with the set screw 28, the handle assembly 10 can be installed. First, the base 32 is slid over the key 42 and then the washer 48, spring 50 and snap ring 52 are installed. The handle 12 can then be placed over the base 32 with a selected orientation so that the window 54 is aligned to permit viewing of the "CLOSED" indicia on the surface 30 of the collar 26. Note that the spline connection 36, 38 of the handle 12 and the base 32 permits the handle 12 to be aligned with the collar 26 indicia regardless of the rotational position of the collar 26. After the handle 12 is aligned, it is fixed to the base 32 using the set screw 40. This is the assembled condition illustrated in FIG. 1 with the valve A closed and the handle 12 aligned to permit viewing of the word "CLOSED" on the collar 26.

The valve A can next be opened by simply turning the handle 12 a quarter turn, such as is illustrated in FIG. 2B and the window 54 will now permit viewing of the word "OPEN". Operation of the handle 12 by rotating between first and second positions to correspondingly close and open the valve A is thus accomplished with the handle in the axial position illustrated in FIG. 1. The spline coupling between the handle 12 and the base 32 thus permits any selected alignment of the handle 12, the indicia 58 (FIG. 2A) and the valve A position.

In accordance with another aspect of the invention, a lockout feature is provided. The term "lockout" as used herein includes without limitation the ability to disengage the handle 12 from the driven member 14 so that the handle 12 cannot actuate the driven member. The term "lockout" further contemplates without limitation the optional ability to actually lock the handle in a desired axial position using a locking device such as a padlock, or even a simple bar or other device. Therefore, as used herein, when reference is made to a lockout feature, it is to be construed broadly to include the concepts of disabling, disengaging, locking, inhibiting and similar operations to prevent the handle 12 from actuating the valve A.

Figure 3:
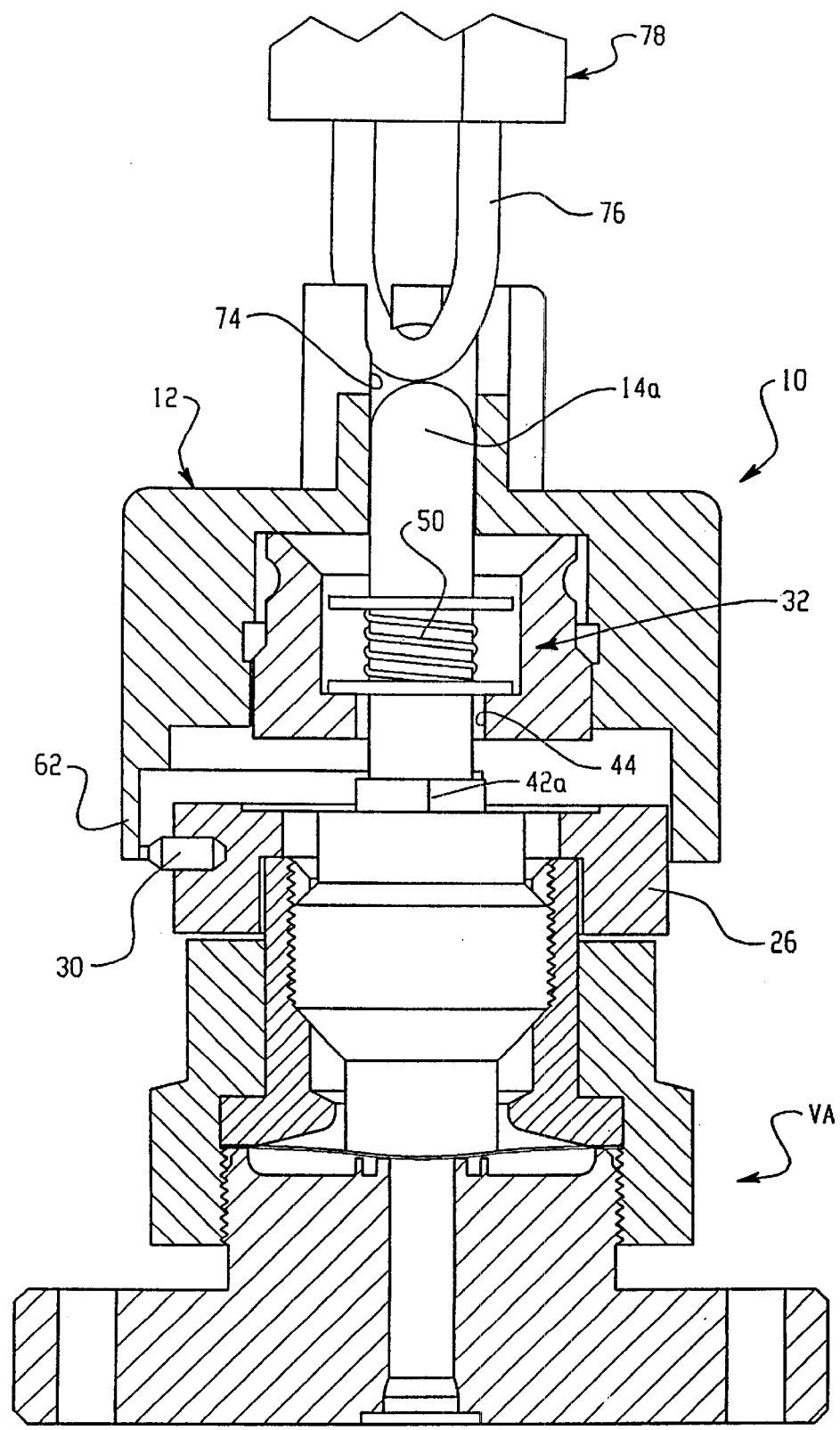
FIG. 3 is a cross-section in elevation of the handle mechanism and valve assembly of FIG. 1 and illustrating the handle in a second axial position and a first angular orientation.
Figure 4:
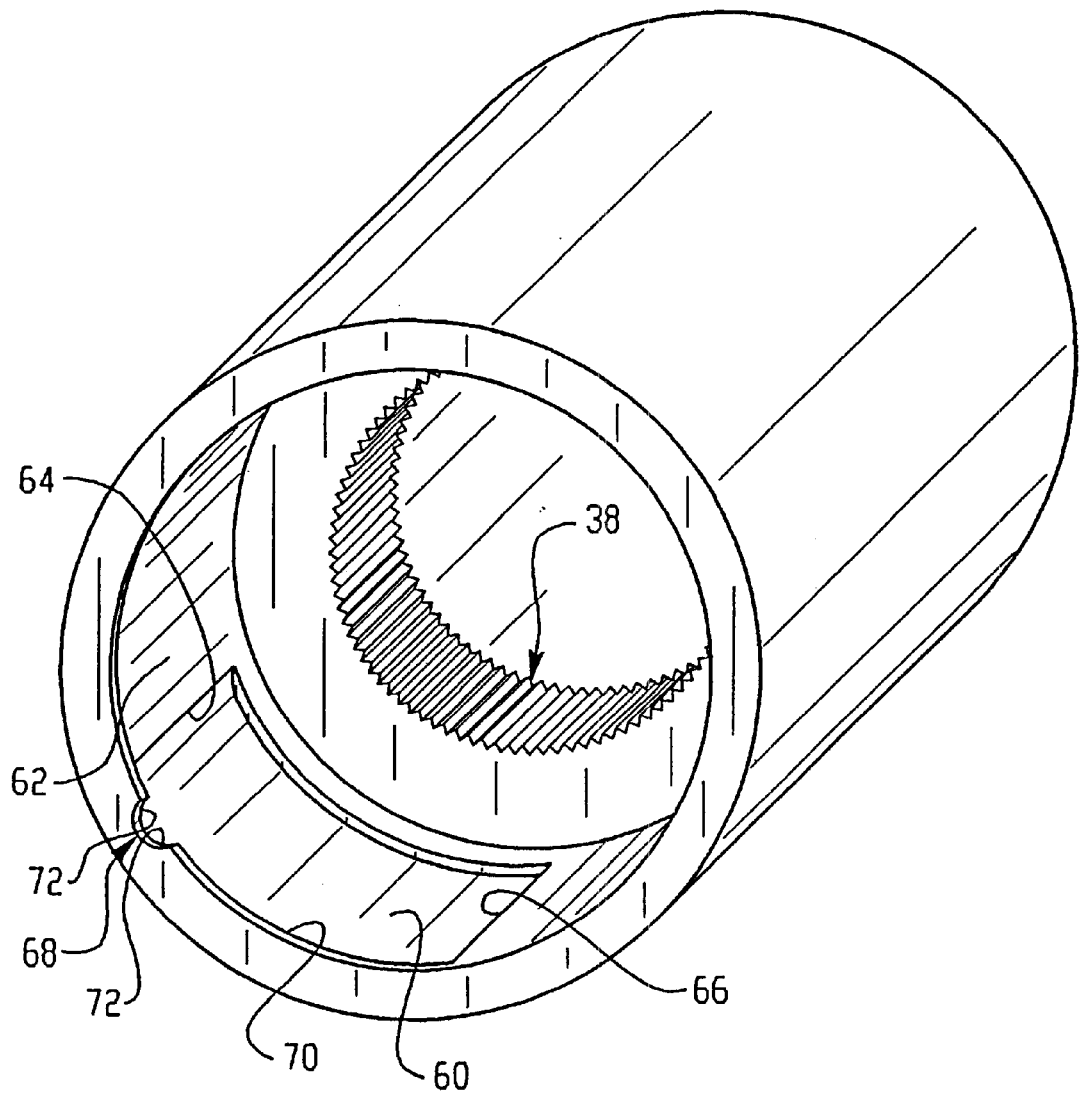
FIG. 4 is a cross-section view of the handle of FIGS. 1–3 showing a guide track formed in the handle interior.

In accordance with this aspect of the invention, the handle 12 includes a second mechanism by which the handle 12 can be disengaged from the driven member 14. The first mechanism is the keyed coupling between the base 32 and the valve stem 14, as was described herein above. The second mechanism is best illustrated in FIGS. 3 and 4 and includes the pin 30 that extends radially from the collar 26 (note that in FIG. 3 the valve A and handle assembly 10 are shown rotated 90° from the view of FIG. 1). The handle 12 includes an arcuate track 60 formed in a lower portion 62 of the handle wall. When the handle 12 is in an engaged position with the driven member 14, such as illustrated in FIG. 1, the a distal end of the pin 30 is aligned in the track 60. The track 60 is delimited by first and second stops 64, 66 that define an arc through which the handle 12 can be rotated. When the pin 30 hits one of the stops 64, 66 the handle 12 cannot turn further. The length of the track 60 is thus selected to coincide with the amount of rotation needed to turn the handle 12 so as to open and close the valve A, typically with an allowance for an amount of over travel to assure the valve A is fully closed and open.

The track 60 also includes a vertically extending slot 68. In the exemplary is embodiment, the handle 12 lower wall 62 includes an inwardly extending lip 70, and the slot 68 is cut through this lip 70. In this embodiment, the slot 68 is positioned at the end of the track 60 that coincides with the valve A in the closed position. Whenever the pin 30 is within the track 60 but not aligned with the vertical slot 68, the handle 12 is prevented from disengaging from the driven member 14, or in other words displaced axially in the exemplary embodiment, because the lip 70 catches on the pin 30. However, when the slot 68 and pin 30 are vertically aligned, the handle 12 can be axially moved to a second position as illustrated in FIG. 3. Note that when the handle 12 is lifted, the connected base 32 is also lifted out of engagement from the keyed valve stem 42a, thus operatively disengaging the handle 12 from the driven member 14. It will be further noted that the handle wall 62 and slot 68 can be designed so that the pin 30 is captured or remains within the slot 68 when the handle 12 is fully lifted, so that the pin 30 catches on the side walls 72 of the slot 68. In such an embodiment, the handle 12 will be prevented against rotation when it is in its raised or disengaged position.

Thus, the pin 30 and track 60 design provides a coupling mechanism that permits the handle to be translated or displaced axially, or in other words to be translated axially between a first axial position in which the handle 12 is engaged with the driven member 14, and a second axial position in which the handle 12 is disengaged from the driven member 14. Optionally, the pin and track can be designed to prevent rotation of the handle 12 when the handle 12 is in one of its two axial positions (in the exemplary embodiment, this occurs when the handle is in the disengaged position). In this manner, the handle 12 is locked out against rotation when it is in the disengaged position.

It will also be noted that the vertical slot 68 also serves to define a predetermined and selectable angular orientation for the handle to be axially displaced. In the exemplary embodiment, the handle 12 can only be axially translated when the valve A is fully closed. Alternatively, the slot 68 could be positioned at an opposite end of the track 60 so that the handle could only be axially moved when the valve is open. Still further, two slots could be provided at either end of the track 60 to allow the handle to be moved axially in the open and closed position. It is also important to note that a single pin 30 and slot 68 arrangement as illustrated also insures that the handle 12 can be returned to an engaged position only when the pin aligns with the slot. In other words, the handle 12 is only re-engaged with the driven member in the same angular orientation from which it was disengaged. So, for example, if the apparatus is designed to permit the handle 12 to be lifted when the valve A is closed, the handle 12 can only be returned to the engaged position that corresponds to the valve closed, assuring that the indicia 58 is properly aligned with the handle window 54.

The operation of the pin 30, track 60 and slot 68 arrangement shares some features with the keyed coupling 42, 44 in that the pin and slot/track can be used to permit movement of the handle 12 axially to disengage the handle 12 from the driven member 14, as well as to assure that the handle 12 can be re-engaged only in the same orientation as when it was lifted. Therefore, when the pin 30 embodiment is used, the keyed coupling 42, 44 is redundant. However, in some applications it may be desirable to use both, wherein the keyed coupling 42, 44 serves as a backup feature in case the pin is defeated. In such an embodiment, even if the pin 30 is defeated, the keyed coupling 42, 44 assures that the handle 12 re-engages in the same angular orientation as when it was disengaged.

The handle extension 22 includes a machined slot or groove 74 that can receive a lockout device such as a bar or rod, for example, or a locking device such as a hasp 76 of a lock 78. As illustrated in FIG. 3, when the handle 12 is axially moved to its second or raised position, the handle extension 22 is also displaced away from the stem extension 14a, thus unblocking the groove 74 to permit insertion of the hasp 76. In the exemplary embodiment herein, when the handle 12 is in its first or engaged axial position as illustrated in FIG. 1, the stem extension 14a blocks the groove 74. Thus, the exemplary embodiment is locked in the closed position only. Alternatively, the stem extension 14a and handle extension 22 can be configured to permit the handle assembly 10 to be locked in the open position. For example, a retractable lockable pin (not shown) could be provided that could accept a lock and prevent raising the handle 12 until the lock is removed.

It is also important to note that the various features of the invention can be readily adapted for use with valves that utilize half turn, three-quarter turn and even full turn and multi-turn handle operation. Multi-turn operation can be accommodated, for example, by using the keyed coupling alone. The keyed coupling when used alone permits the handle 12 to be moved axially from any angular orientation with respect to the driven member (i.e. disengage) but also to always be re-engaged only in the same orientation.

The lip 70 could be omitted thus permitting the handle 12 to be raised and disengaged, and if desired locked out, from any angular orientation independent of the position of the valve A.

As a further alternative embodiment, the slot 68 may be closed at its lower end to engage the pin 30, thus preventing complete separation of the handle 12 and the valve A. In the exemplary embodiment, this modification may be a back up feature tot he snap ring 52.

The present invention can be applied to numerous other devices, other than valves, having a driven member that is driven by a rotary handle. More generally, the invention can be applied to any rotary handle that is coupled to a driven member that is coupled to the handle 12 and that can be disengaged from the handle by relative translational movement thereof.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus for coupling a rotary drive handle to a driven member, comprising:
   a drive handle;
   a driven member that can be moved between a driven member first position and a driven member second position by rotation of said handle about an axis;
   said handle being movable along said axis to a first handle position and a second handle position; and
   a coupling mechanism that couples said handle to said driven member when said handle is in said first handle position and that uncouples said handle and said driven member when said handle is in said second handle position;
   said coupling mechanism operating to prevent movement of said handle along said axis when said driven member is in a predetermined position.

2. The apparatus of claim 1 wherein said handle has a first angular orientation that corresponds to said driven member first position and a second angular orientation that corresponds to said driven member second position; said coupling mechanism restricting said handle to a predetermined angular orientation in order to move said handle axially between said first and second handle positions.

3. The apparatus of claim 2 wherein said coupling mechanism comprises a keyed shaft portion of said driven member and a mating keyed portion of said handle.

4. The apparatus of claim 3 wherein said driven member keyed shaft portion and said handle keyed portion are mated when said handle is in said first handle position and are unmated when said handle is in said second handle position.

5. The apparatus of claim 2 wherein said predetermined angular orientation can be set at any angular position of the handle.

6. The apparatus of claim 2 wherein said predetermined orientation corresponds to one of said driven member first and second positions.

7. The apparatus of claim 1 comprising an alignment mechanism for radially aligning said handle and said driven member; wherein said handle has a first angular orientation that corresponds to said driven member first position and a second angular orientation that corresponds to said driven member second position; said alignment mechanism restricting said handle to said first angular orientation in order to move said handle axially between said first and second handle positions.

8. The apparatus of claim 7 wherein said coupling mechanism also restricts said handle to said first angular orientation in order to move said handle axially between said first and second handle positions.

9. The apparatus of claim 7 wherein said alignment mechanism limits rotation of said handle about said axis between said first and second angular orientations when said handle is in said handle first position, and substantially prevents handle rotation when said handle is in said handle second position.

10. The apparatus of claim 7 wherein said alignment mechanism substantially prevents axial movement of said handle other than when said handle is in said first angular orientation.

11. The apparatus of claim 7 wherein said alignment mechanism comprises a guide and track arrangement; said track being formed in a portion of said handle and said guide being positionally fixed with respect to said handle and said driven member.

12. The apparatus of claim 11 wherein said track lies on a angular arc relative to said axis; said track having first and second ends that correspond to said handle first and second angular orientations; said guide being positioned within said track when said handle is in its first position; said guide engaging said first and second track ends to limit rotation of said handle.

13. The apparatus of claim 12 wherein said track comprises a slot portion that extends from one end of said track in parallel with said axis and that corresponds to said handle first angular orientation; said guide being positioned in said slot portion when said handle is axially moved between said first and second handle positions.

14. The apparatus of claim 13 wherein said guide and slot substantially prevent axial movement of said handle beyond said handle second position.

15. The apparatus of claim 7 comprising a body that supports said driven member for relative rotation; said body including indicia that indicate said handle is in said first and second angular orientations.

16. The apparatus of claim 15 wherein said handle comprises a cutout portion through which said indicia can be viewed when said handle is in said first and second angular orientations.

17. The apparatus of claim 15 wherein prior to assembly of said handle with said coupling mechanism, said driven member can be rotated relative to said body to position said driven member in its first position, said alignment mechanism and coupling mechanism permitting said handle thereafter to be assembled with said coupling mechanism in said handle first angular orientation only substantially independent of said driven member angular orientation.

18. The apparatus of claim 17 wherein said coupling mechanism comprises a base member that is coupled to said driven member when said handle is in said handle first position; said base member having a splined coupling to said handle.

19. The apparatus of claim 1 wherein said handle can be locked when it is in its second handle position.

20. The apparatus of claim 19 wherein said handle comprises a receptacle that accepts a lockout device when said handle is in said second handle position only.

21. The apparatus of claim 20 wherein said lockout device prevents said handle from axially moving to said handle first position when said lockout device is installed in said receptacle.

22. The apparatus of claim 1 comprising a bias element that urges said handle towards said handle first position.

23. The apparatus of claim 1 wherein said driven member comprises a valve stem of a hand operated rotary actuated valve.

24. The apparatus of claim 23 wherein said valve comprises a diaphragm valve.

25. A handle assembly for a rotary actuated valve, comprising:
a manually operated handle;
a valve stem that can be rotated about a longitudinal axis to a valve stem first position and a valve stem second position by rotation of said handle about said axis;
said handle being movable along said axis to a first handle position and a second handle position;
a coupling mechanism that couples said handle to said valve stem when said handle is in said first handle position and that uncouples said handle and said valve stem when said handle is in said second handle position; said coupling mechanism operating to prevent movement of said handle along said axis except when said driven member is in a predetermined position.

26. The apparatus of claim 25 wherein said handle has a first angular orientation that corresponds to said valve stem first position and a second angular orientation that corresponds to said valve stem second position; said coupling mechanism restricting said handle to said first angular orientation in order to move said handle axially between said first and second handle positions.

27. The apparatus of claim 26 wherein said coupling mechanism comprises a keyed shaft portion of said valve stem and a mating keyed portion of said handle.

28. The apparatus of claim 27 wherein said valve stem keyed shaft portion and said handle keyed portion are mated when said handle is in said first handle position and are unmated when said handle is in said second handle position.

29. The apparatus of claim 25 comprising an alignment mechanism for radially aligning said handle and said valve stem; wherein said handle has a first angular orientation that corresponds to said valve stem first position and a second angular orientation that corresponds to said valve stem second position; said alignment mechanism restricting said handle to said first angular orientation in order to move said handle axially between said first and second handle positions.

30. The apparatus of claim 29 wherein said coupling mechanism also restricts said handle to said first angular orientation in order to move said handle axially between said first and second handle positions.

31. The apparatus of claim 29 wherein said alignment mechanism limits rotation of said handle about said axis between said first and second angular orientations when said handle is in said handle first position, and substantially prevents handle rotation when said handle is in said handle second position.

32. The apparatus of claim 29 wherein said alignment mechanism substantially prevents axial movement of said handle other than when said handle is in said first angular orientation.

33. The apparatus of claim 29 wherein said alignment mechanism comprises a pin and track arrangement; said track being formed in a portion of said handle and said pin being positionally fixed with respect to said handle and said valve stem.

34. The apparatus of claim 33 wherein said track lies on a angular arc relative to said axis; said track having first and second ends that correspond to said handle first and second angular orientations; said pin being positioned within said track when said handle is in its first position; said pin engaging said first and second track ends to limit rotation of said handle.

35. The apparatus of claim 34 wherein said track comprises a slot portion that extends form one end of said track in parallel with said axis and that corresponds to said handle first angular orientation; said pin being positioned in said slot portion when said handle is axially moved between said first and second handle positions.

36. The apparatus of claim 35 wherein said pin and slot substantially prevent axial movement of said handle beyond said handle second position.

37. The apparatus of claim 29 comprising a valve body that supports said valve stem for relative rotation; said body including indicia that indicate said handle is in said first and second angular orientations.

38. The apparatus of claim 37 wherein said handle comprises a cutout portion through which said indicia can be viewed when said handle is in said first and second angular orientations.

39. The apparatus of claim 37 wherein prior to assembly of said handle with said coupling mechanism, said valve stem can be rotated relative to said body to position said valve stem in its first position, said alignment mechanism and coupling mechanism permitting said handle thereafter to be assembled with said coupling mechanism in said handle first angular orientation only substantially independent of said valve stem angular orientation.

40. The apparatus of claim 39 wherein said coupling mechanism comprises a base member that is coupled to said valve stem when said handle is in said handle first position; said base member having a splined coupling to said handle.

41. The apparatus of claim 25 wherein said handle can accept a lockout device when it is in its second handle position.

42. The apparatus of claim 41 wherein said handle comprises a receptacle that accepts a lockout device when said handle is in said second handle position only.

43. The apparatus of claim 42 wherein said lockout device prevents said handle from axially moving to said handle second position when said lockout device is installed in said receptacle.

44. The apparatus of claim 25 comprising a bias element that urges said handle towards said handle first position.

45. The apparatus of claim 25 wherein said valve comprises a diaphragm valve.

46. The apparatus of claim 25 wherein said valve stem first position corresponds to a valve closed condition.

47. The apparatus of claim 25 wherein said valve stem first position corresponds to a valve open condition.

48. The apparatus of claim 25 wherein said handle can accept a lockout device in its first and second positions.

49. A method for hand operating a rotary actuated valve, comprising the steps of:

rotating a manually operating handle to open and close the valve by axial movement of a valve stem in response to handle rotation about said axis when said handle is in a first handle position;

axially moving said handle from said first handle position to a second handle position to disengage said handle from said valve stem; wherein said handle may only be axially moved to one of said first or second handle positions when said valve stem is in a predetermined position; and maintaining said handle in said second handle position to substantially prevent rotating said valve stem while the handle is in said handle second position.

50. The method of claim 49 comprising the step of substantially preventing axial movement of the handle other than when the handle is in a predetermined angular orientation.

51. The method of claim 49 comprising the step of substantially preventing rotation of the handle when the handle is in said handle second position.

52. The method of claim 49 comprising the step of locking the handle when the handle is in said handle second position.

53. The method of claim 49 comprising the step of using the handle to expose and cover indicia on the valve body that indicates valve open and closed positions as a function of the handle angular orientation.

54. Apparatus for coupling a rotary drive handle to a driven member, comprising:

a drive handle;

a driven member that can be moved between a driven member first position and a driven member second position by rotation of said handle about an axis;

said handle being movable along said axis to a first handle position and a second handle position;

a coupling mechanism that couples said handle to said driven member when said handle is in said first handle position and that uncouples said handle and said driven member when said handle is in said second handle position;

said coupling mechanism operating to prevent movement of said handle along said axis when said driven member is in a predetermined position; and an alignment mechanism for radially aligning said handle and said driven member; wherein said handle has a first angular orientation that corresponds to said driven member first position and a second angular orientation that corresponds to said driven member second position; said alignment mechanism restricting said handle to said first angular orientation in order to move said handle axially between said first and second handle position;

said alignment mechanism limiting rotation of said handle about said axis between said first and second angular orientations when said handle is in said handle first position, and substantially prevents handle rotation when said handle is in said handle second position.

55. Apparatus for coupling a rotary drive handle to a driven member, comprising:

a drive handle;

a driven member that can be moved between a driven member first position and a driven member second position by rotation of said handle about an axis;

said handle being movable along said axis to a first handle position and a second handle position;

a coupling mechanism that couples said handle to said driven member;

said coupling mechanism operating to prevent movement of said handle along said axis when said driven member is in a predetermined position; and an alignment mechanism for radially aligning said handle and said driven member; wherein said handle has a first angular orientation that corresponds to said driven member first position and a second angular orientation that corresponds to said driven member second position; said alignment mechanism restricting said handle to said first angular orientation in order to move said handle axially between said first and second handle position;

said alignment mechanism limiting rotation of said handle about said axis between said first and second angular orientations when said handle is in said handle first position, and substantially prevents handle rotation when said handle is in said handle second position.

56. Apparatus for coupling a rotary drive handle to a driven member, comprising:

a drive handle;

a driven member that can be moved between a driven member first position and a driven member second position by rotation of said handle about an axis;

said handle being movable along said axis to a first handle position and a second handle position; and a coupling mechanism that couples said handle to said driven member when said handle is in said first handle position and that uncouples said handle and said driven member when said handle is in said second handle position;

said coupling mechanism operating to prevent movement of said handle along said axis when said driven member is in a predetermined position;

wherein said handle can be locked when it is in its second handle position.

57. Apparatus for coupling a rotary drive handle to a driven member, comprising:

a drive handle;

a driven member that can be moved between a driven member first position and a driven member second position by rotation of said handle about an axis;

said handle being movable along said axis to a first handle position and a second handle position; and a mechanism that couples said handle to said driven member;

said mechanism operating to prevent movement of said handle along said axis except when said driven member is in a predetermined position.

* * * * *